(No Model.)
J. WATERHOUSE.
OPERA GLASS.
No. 256,521. Patented Apr. 18, 1882.
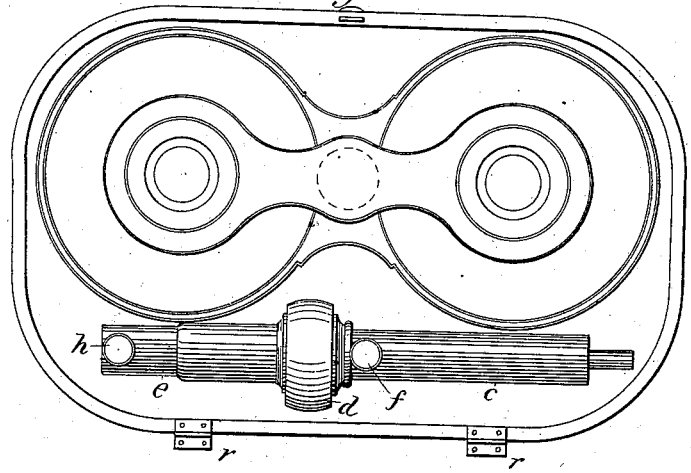
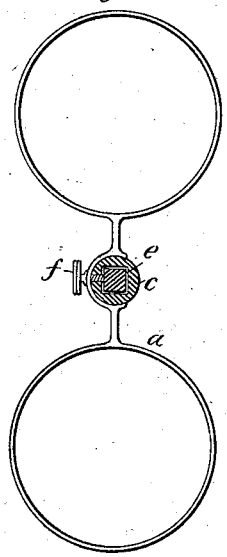
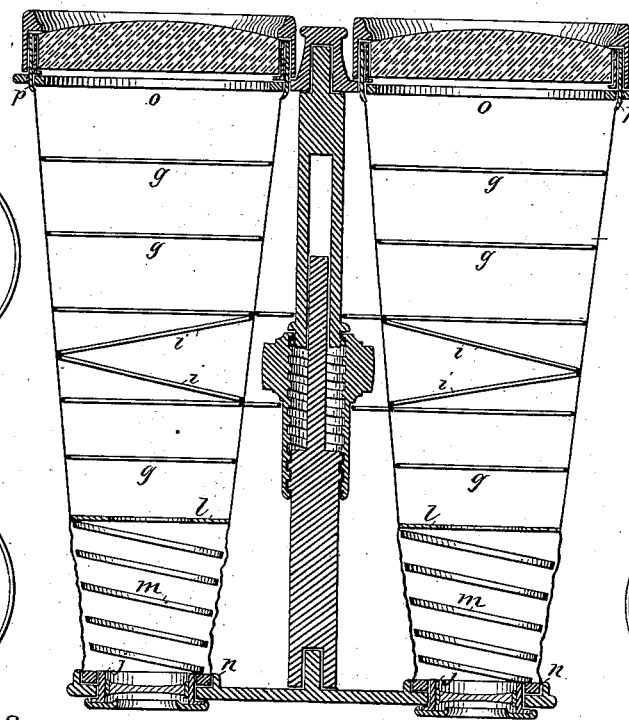
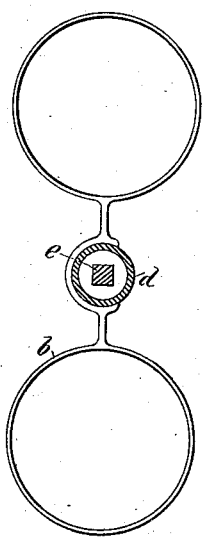
Witnesses.
George Turnbull
W. H. Harrington.
Inventor
John Waterhouse

UNITED STATES PATENT OFFICE.

JOHN WATERHOUSE, OF NEW YORK, N. Y.

OPERA-GLASS.

SPECIFICATION forming part of Letters Patent No. 256,521, dated April 18, 1882.

Application filed March 17, 1881. (No model.)

*To all whom it may concern:*

Be it known that I, JOHN WATERHOUSE, a citizen of the United States, residing at the city of New York, in the State of New York, have invented certain new and useful Improvements in Opera, Field, and Marine Glasses, of which the following is a specification.

The object of my invention is to make the frames of the opera, field, or marine glasses of concentric rings or conically-formed spiral springs, or a combination of both, to be made of metal or any other suitable material, and to be covered with kid-skin, silk, cloth, india-rubber, or any other like material of a pliable nature, so that it may be of light weight, and when not in use folded in the smallest space possible and laid in a flat case made expressly for the purpose, so as to be conveniently carried in the pocket.

Figure 1 shows the glass to be folded up and placed in its case, the eye and object lenses lying close together, the adjusting-stem detached and placed in its receptacle. The lid of the case is shown by the hinges $r\,r$, to be removed.

Fig. 2 represents a longitudinal section of the glass through the axes of the lenses and the adjusting-stem. Figs. 3 and 4 are cross-sections at $a$ and $b$ respectively.

The adjusting-stem is in three parts, indicated by the letters $c$, $d$, and $e$. $c$ has a square tenon on one end, which fits into a mortise in the cross-bar or yoke of the object-lenses, and is fastened to it by a thumb-screw similar to $f$. The other end of $c$ has a long square mortise, into which the long tenon of the part $e$ freely slides. The other end of $e$ has a mortise into which the tenon attached to the cross-bar or yoke of the eye-lenses slips, and to which it is secured by the thumb-screw shown at $h$, Fig. 1. $e$ has also a male screw, which works into the female screw of the part $d$. One end of $d$ is fastened by a swivel-joint to the end of $c$, so that by turning $d$ with the thumb and fingers the part $e$ may be moved in and out, and by so doing focus the glass.

$g\,g\,g\,g$, &c., are rings of metal concentric to the axes of the lenses, and to which the pliable coverings $s\,s$, of kid, silk, cloth, &c., are fastened.

$a$ and $b$ are yokes, each connecting two rings, as shown in the cross-sections, Figs. 3 and 4. The yoke $a$ is fastened to the stem by the thumb-screw $f$, the object of which is to prevent a turning motion of the two frames around the stem. The yoke $b$ is sprung over the thumb-swivel and fits snugly to it, but does not prevent the swivel from turning. The object of this yoke jointly with $a$ and the brace-rings $i\,i\,i$ is to prevent a collapse of the frames from an undue pressure of the thumbs and fingers while adjusting the focus.

$l\,l$ are diaphragms, of metal, for cutting off the marginal rays of light, and to which the conically-spiral springs $m\,m$ are fastened. The other ends of the springs are fastened to the rings $n\,n$. The coverings are also fastened to these rings, and the yoke of the eye-lenses fits tightly over them. On the inside of these rings screw-threads are cut, to which are screwed the pieces $j\,j$, containing the eye-lenses. The outer edges of these pieces have rims, by means of which the yoke may be securely fastened to the rings $n\,n$. When the springs $m\,m$ are not strained they lie coiled up on the diaphragms $l\,l$, like the mainspring of a watch; but when the stem is placed in position a tensile strain is brought to bear on the springs, the effect of which is to keep the coverings from the diaphragms to the object-lenses tightly drawn and in proper shape.

At the object end, the coverings go snugly over the rings $o\,o$ and are fastened to them. Two collar-rings, $p\,p$, each with a beveled edge, are fastened to the yoke of the object-lenses. These collars are forced over the rings $o\,o$. To each of the collars are screwed two other rings, one internally, the other externally, by which the object-lenses are made fast to the frame.

What I claim as my invention, and desire to secure by Letters Patent of the United States, is—

The combination of rings $a$ and $b$, attached and fastened as described, whereby the frame is prevented from turning or collapsing, as set forth.

JOHN WATERHOUSE.

Witnesses:
W. H. HARRINGTON,
GEORGE TURNBULL,